US012457561B2

(12) United States Patent
Charipadi et al.

(10) Patent No.: US 12,457,561 B2
(45) Date of Patent: Oct. 28, 2025

(54) METHOD AND SYSTEM FACILITATING IMPROVED DOWNLINK MIMO SECTOR THROUGHPUT IN THE PRESENCE OF UE DC-OFFSET

(71) Applicant: Radisys India Private Limited, Bangalore (IN)

(72) Inventors: Gopikrishna Charipadi, Bangalore (IN); Saikat Senapati, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 559 days.

(21) Appl. No.: 18/048,870

(22) Filed: Oct. 24, 2022

(65) Prior Publication Data

US 2023/0139022 A1 May 4, 2023

(30) Foreign Application Priority Data

Oct. 29, 2021 (IN) .............................. 202141049699

(51) Int. Cl.
*H04W 52/24* (2009.01)
*H04W 52/36* (2009.01)
*H04W 52/42* (2009.01)

(52) U.S. Cl.
CPC ....... *H04W 52/241* (2013.01); *H04W 52/365* (2013.01); *H04W 52/42* (2013.01)

(58) Field of Classification Search
CPC ... H04W 52/24; H04W 52/241; H04W 52/36; H04W 52/365
See application file for complete search history.

(56) References Cited

U.S. PATENT DOCUMENTS

| | | | | |
|---|---|---|---|---|
| 9,036,494 B2* | 5/2015 | Wen | ...................... | H04W 52/42 |
| | | | | 370/252 |
| 10,051,618 B2* | 8/2018 | Gho | ........................ | H04L 1/203 |
| 10,299,235 B2* | 5/2019 | Seo | ...................... | H04J 11/0076 |
| 11,102,734 B2* | 8/2021 | Lee | ...................... | H04L 5/0053 |
| 11,622,354 B2* | 4/2023 | Pan | .................. | H04W 72/0473 |
| | | | | 370/329 |
| 11,671,158 B2* | 6/2023 | Hao | ........................ | H04L 1/203 |
| | | | | 370/329 |

(Continued)

FOREIGN PATENT DOCUMENTS

| | | | | |
|---|---|---|---|---|
| EP | 1953986 A2 * | 8/2008 | ............. | H04L 5/006 |
| VN | 10026691 B * | 12/2020 | ............. | H04L 5/006 |
| WO | WO-2020251198 A1 * | 12/2020 | ........... | H04B 7/0626 |

*Primary Examiner* — Hai V Nguyen
(74) *Attorney, Agent, or Firm* — FINNEGAN, HENDERSON FARABOW, GARRETT & DUNNER LLP.

(57) ABSTRACT

The present invention provides a method and system for facilitating improved downlink MIMO sector throughput in the presence of UE DC-offset. The system receives BLER from a plurality of UEs and tracks by L1 computing the DL BLER in a UE; checks if the BLER from the UE allocated with an RB containing a DC subcarrier is above a target BLER and if so the L1 increases the power of the RE containing the DC-subcarrier in steps of 3 dB. If the BLER improves in the UE, the L1 stops further increase of power on the DC subcarrier RE. The L1 maintains the improved UE/sector throughput and the subcarrier RE power. The system further supports a plurality of 5G NR UEs with different bandwidth wherein the DC-carrier of each UE can be worked out by the L2 by a set of predefined instructions.

20 Claims, 11 Drawing Sheets

(56) References Cited

U.S. PATENT DOCUMENTS

| | | | | |
|---|---|---|---|---|
| 11,729,796 B2* | 8/2023 | Futaki | | H04W 72/12 |
| | | | | 370/329 |
| 11,737,076 B2* | 8/2023 | Pan | | H04W 52/367 |
| | | | | 455/522 |
| 11,743,102 B1* | 8/2023 | Gatherer | | H04W 88/18 |
| | | | | 455/418 |
| 11,743,871 B2* | 8/2023 | Rico Alvarino | | H04L 5/005 |
| | | | | 370/329 |
| 11,792,832 B1* | 10/2023 | Iyer | | H04L 1/0003 |
| 12,075,400 B2* | 8/2024 | Pan | | H04W 52/346 |
| 12,081,346 B2* | 9/2024 | Talarico | | H04L 5/0055 |
| 12,324,017 B2* | 6/2025 | Talarico | | H04L 1/187 |
| 2008/0214120 A1 | 9/2008 | Nakaya | | H04L 5/0046 |
| | | | | 455/67.13 |
| 2012/0314603 A1* | 12/2012 | Wen | | H04W 52/42 |
| | | | | 370/252 |
| 2013/0051270 A1* | 2/2013 | Ren | | H04L 1/0009 |
| | | | | 370/252 |
| 2013/0182569 A1* | 7/2013 | Bertrand | | H04L 1/0009 |
| | | | | 370/252 |
| 2015/0326288 A1* | 11/2015 | Lee | | H04B 7/063 |
| | | | | 375/267 |
| 2016/0278102 A1* | 9/2016 | Bontu | | H04L 1/0026 |
| 2016/0309476 A1* | 10/2016 | Madan | | H04W 28/0236 |
| 2017/0230926 A1* | 8/2017 | Seo | | H04J 11/00 |
| 2017/0331670 A1* | 11/2017 | Parkvall | | H04W 52/028 |
| 2018/0007664 A1* | 1/2018 | Gho | | H04L 1/08 |
| 2019/0089498 A1* | 3/2019 | Pelletier | | H04L 5/005 |
| 2020/0136763 A1* | 4/2020 | Lee | | H04L 1/0031 |
| 2020/0221395 A1* | 7/2020 | Lee | | H04W 52/146 |
| 2020/0280927 A1* | 9/2020 | Charipadi | | H04W 52/241 |
| 2020/0328795 A1* | 10/2020 | Hao | | H04B 17/24 |
| 2020/0389859 A1* | 12/2020 | Lee | | H04L 5/0053 |
| 2021/0243782 A1* | 8/2021 | Miao | | H04L 5/0091 |
| 2021/0336688 A1* | 10/2021 | Lee | | H04W 4/40 |
| 2022/0217042 A1* | 7/2022 | Santhanam | | H04B 7/0404 |
| 2022/0312481 A1* | 9/2022 | Talarico | | H04W 74/0866 |
| 2023/0058672 A1* | 2/2023 | Guo | | H04W 52/0219 |
| 2023/0195489 A1* | 6/2023 | Lan | | H04W 84/02 |
| | | | | 718/1 |
| 2023/0239069 A1* | 7/2023 | Liu | | H04L 1/0019 |
| | | | | 370/252 |
| 2023/0246729 A1* | 8/2023 | Li | | H04L 1/0019 |
| | | | | 370/328 |
| 2023/0396356 A1* | 12/2023 | Pauli | | H04L 5/0055 |
| 2024/0147471 A1* | 5/2024 | Islam | | H04W 72/51 |
| 2024/0155503 A1* | 5/2024 | Wang | | H04W 52/242 |
| 2024/0187176 A1* | 6/2024 | Wang | | H04W 72/23 |
| 2024/0188005 A1* | 6/2024 | Han | | H04W 52/365 |
| 2024/0196178 A1* | 6/2024 | Ying | | H04W 8/18 |
| 2024/0223341 A1* | 7/2024 | Panteleev | | H04L 1/0026 |
| 2024/0298370 A1* | 9/2024 | Freda | | H04W 40/22 |
| 2024/0357379 A1* | 10/2024 | Gullberg | | G06N 5/01 |
| 2024/0365322 A1* | 10/2024 | Islam | | H04W 72/20 |
| 2025/0008526 A1* | 1/2025 | Herath | | H04W 72/563 |
| 2025/0105887 A1* | 3/2025 | Wang | | H04B 7/0469 |

* cited by examiner

METHOD AND SYSTEM FACILITATING IMPROVED DOWNLINK MIMO SECTOR THROUGHPUT IN THE PRESENCE OF UE DC-OFFSET

FIELD OF INVENTION

The embodiments of the present disclosure generally relate to a method and apparatus for data transmission in a multi-input multi output communication system, and more particularly to an improvement in performance of transmission with multiple code blocks when there is a DC offset in one or more user equipments.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A multi-antenna communication system, commonly referred to as a multiple input multiple output (MIMO) system, is widely used in wireless communication to improve the performance of communication systems. In a MIMO system, the transmitter has multiple antennas capable of transmitting independent signals, and the receiver is equipped with multiple receive antennas. Many MIMO mechanisms are often used in advanced wireless systems.

When channel conditions are favorable (eg, when the speed of mobility is low), it is possible to use closed loop multiple input multiple output (MIMO) mechanisms to improve system performance. In a closed loop MIMO system, the receiver feeds back channel conditions to the transmitter and/or preferably transmits a MIMO processing mechanism. The transmitter uses this feedback information to jointly optimize the transport mechanism along with other considerations such as scheduling priorities, data, and resource availability. The closed loop MIMO mechanism of this optimization is called MIMO precoding. In the case of precoding, the transport stream is pre-multiplied by the precoding matrix before being passed to multiple transmit antennas. Another aspect of a multiple input multiple output (MIMO) system is to separately encode or encode multiple data streams for transmission. All layers for data transmission are encoded together in a single codeword group (SCW) MIMO system, while all layers are separately encoded in a multi-codeword group (MCW) system. Single-user MIMO (SU-MIMO) and multi-user MIMO (MU-MIMO) are used on the downlink under Long Term Evolution (LTE).

Channel interleavers that include mapping of coded bits to modulation symbols from different code blocks and mapping of self-modulating symbols to time, frequency, and spatial resources are carefully designed to ensure that each code block gets roughly the same. When transmitting multiple code blocks, it is beneficial to allow the receiver to begin decoding some code blocks while the receiver is still demodulating the modulation symbols of other code blocks. In a Long-Term Evolution (LTE) system and in 5G Next Generation Radio (NR) system, the above approach presents a challenge because channel estimation performance may be adversely affected if there are not enough reference signals during demodulation and decoding.

In the existing MIMO system, a 5%-10% block error rate (BLER) was observed, when transmission time interval (TTI) of at least eight user equipment (UE) for a down link in a 20 Mhz Carrier Bandwidth, 4×4 MIMO with a 256-bit quadrature amplitude modulation (QAM) for a radio link control (RLC) acknowledged mode (RLC_AM) and an RLC unacknowledged mode TCP/UDP data or 8UE/TTI, DL 4×4 MIMO, 256-QAM, RLC_AM/RLC_UM, Transmission Control Protocol (TCP)/User Datagram Protocol (UDP) data was tested. As a consequence, it was found that only 380 Mbps throughput was obtained instead of 404 Mbps throughput for 20 Mhz. For example, at 8UE/TTI, 106 resource blocks (RBs) (20 Mhz), the number of RBs assigned for each UE were at least 13 RBs (evenly distributed RB allocation by L2). Out of these 8UEs, 1 UE was particularly found to be affected and showed most of the BLER (cyclic redundancy check (CRC) FAIL), always. That is, UE #1: prb=1:13; CRC PASS
UE #2: prb=14:13; CRC PASS
UE #3: prb=27:13; CRC PASS
UE #4: prb=40:13; CRC PASS
UE #5: prb=53:13; CRC FAIL
UE #6: prb=66:13; CRC PASS
UE #7: prb=79:14; CRC PASS
UE #8: prb=93:12 CRC PASS The affected UE #5 that had consistently failing CRC, was the one which had within its 13 RBs allocated, an RB containing a DC subcarrier. Since average channel quality indicator (CQI) reported over the 13 RBs for the UE is very good (CQI=15), the L2 scheduler assigned the highest modulation-order i.e., 256-QAM at the highest MCS=27 (code-rate 0.92578125) for full-throughput. But since the redundancy bits due to this high-code rate is very less it leads to 1152 bits at RB containing DC-carrier per slot to be in error, when residual DC-offset is present in the UE receiver, out of the total 13824 bits received per slot (i.e., 8% bits in error every slot) as illustrated in the table below. This caused this UE to consistently give high CRC FAIL. The following table shows the highlights of the CRC failure of the UE #5.

TABLE 1

| Affected UE (100% BLER) | | |
|---|---|---|
| Number of bits on DC carrier | 8 | |
| Number of RBs(?) | 12 | |
| Total # of SCs | 144 | |
| # of bits in total SCs symbol | 1152 | number of bits in error for 12 REs around the DC-subcarrier |
| # of PDSCH symbols per slot | 12 | |
| Total bits per slot for the affected UE | 13824 | |
| Total bits for the affected UE per sec | 13824000 | bps |

Hence there was overall 6% sector throughput BLER and the throughput was 380 Mbps instead of theoretical 405 Mbps. Further, direct current (DC)-offset is an issue in direct conversion receivers. Direct conversion receivers are popular in UE devices since they are less costly (less BOM). DC-offset is also called Local-oscillator leakage and occurs due to self-mixing of the local-oscillator leakage reflected back at the receiver mixer. There are other sources that can give rise to DC-offset namely, analog-to-digital converter (ADCs), IQ receiver path asymmetries etc. The key-point is that although today's radio-frequency integrated circuits (RFICs) may be equipped with complex dynamic DC-offset removal circuitry, the DC-offset can only be removed to a limited extent, around −60 dBm (refer Table 2 below from Analog Device latest 5G RFIC ADRV9029). The residual DC-offset of −60 dBm still forms a large proportion of the received signal in the cases where the UE devices are further away from the 5G Base-station wherein the received UEs signal levels are such that the ADC digital output starts to lose the dynamic range on the received signal since Automatic Gain Control (AGC) at the ADC is already at the maximum (typically max 40 dB AGC in ADI RFICs) and can no longer boost the lower received signal as the UE moves away. As a consequence, the normally 12-bit IQ ADC Full-scale bit-width of the received signal post-AGC at UE RFIC output begins to drop down as the UE moves further and further away from the base station and the received signal level at UE will decrease due to increase in path loss and thus the received signal post AGC will be reduced typically by 6 dB loss/bit.

TABLE 2

Rx Input LO Leakage at Maximum Gain

| | | |
|---|---|---|
| 75 MHz | −68 | dBm |
| 830 MHz | −68 | dBm |
| 1800 MHz | −68 | dBm |
| 2600 MHz | −65 | dBm |
| 3800 MHz | −65 | dBm |
| 4800 MHz | −58 | dBm |
| 5700 MHz | −54 | dBm |

Thus, there is a need for an improved method and a system to increase DL MIMO sector throughput in the presence of one or more UE DC-offsets.

OBJECTS OF THE PRESENT DISCLOSURE

Some of the objects of the present disclosure, which at least one embodiment herein satisfies are as listed herein below.

It is an object of the present disclosure to provide a method and system that decreases BLER in UEs in down link (DL) multi input multi output (MIMO) sector.

It is an object of the present disclosure to provide a method and system that increases from 380 Mbps throughput to at least 404 Mbps throughput for 20 Mhz.

It is an object of the present disclosure to provide a method and system that prevents CRC fail.

It is an object of the present disclosure to provide a method and system that to support multiple 5G NR UEs with different bandwidth wherein the DC-carrier of each UE can be worked out by the L2.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for facilitating improved sector throughput. The system may include one or more processors operatively coupled to a plurality of user equipments (UE), the plurality of UEs further having a downlink communication channel with a multi-input multi output (MIMO) base-station. The one or more processors may execute a set of executable instructions that may be stored in a memory, upon execution of which, the processor may cause the system to: receive, a set of data packets from the plurality of UEs pertaining to downlink (DL) feedback communication signals from each UE and extract, a first set of attributes from the received set of data packets, the first set of attributes pertaining to a DL Block Error Rate (BLER) in each UE. The system may determine, based on the extracted first set of attributes, an average BLER of each UE and compare the determined average BLER of each UE with a predetermined target BLER. The system may further determine if each UE is allocated with a resource block (RB) containing a direct current (DC) subcarrier. If the determined average BLER is greater than the predetermined target BLER in a UE and the UE is allocated with the resource block (RB) containing the DC subcarrier module, the system may increase a DC subcarrier power level in the RB containing the dc-subcarrier up to a maximum pre-determined level.

In an embodiment, a throughput of the UE may increase to a predefined level in response to a decrease in the BLER to a pre-determined level.

In an embodiment, if BLER improves in the UE to a pre-determined level, the one or more processors may be further configured to: prevent scheduling of further power increase on the DC-subcarrier; and, continue to maintain the DC-subcarrier power on the UE until the UE has come closer to the base-station in terms of power level.

In an embodiment, the one or more processors may be further configured to: de-boost the increased DC-subcarrier power level on the RB containing the DC-carrier; and, maintain a full throughput in the RB containing the DC-carrier.

In an embodiment, the one or more processors may be further configured to: determine whether the UE power level has moved closer to the MIMO base station power level based on one or more reports on tracking of one or more UE Power Headroom reports received from the UE; and reduce the boost of the DC-carrier power level by a predefined amount.

In an embodiment, the one or more processors may be further configured to: determine whether the UE is receiving a Downlink communication signal with a higher signal strength based on tracking of one or more UE Power Headroom reports received from the UE; and reduce the boost of the direct current (DC)-carrier power level by a predefined amount.

In an embodiment, in case the BLER does not improve to less than the predetermined target BLER via boosting the DC subcarrier power level, the one or more processors may be further configured to: conclude that the BLER is not due to DC-offset leakage and hence terminates; and, terminate increase in the DC subcarrier power level.

In an embodiment, the one or more processors may be operatively coupled to a plurality of bandwidth channels to support the plurality of UEs to receive a full carrier bandwidth.

In an embodiment, the one or more processors may be configured to support a plurality of UEs with different bandwidth parts and the DC-subcarrier of each UE is located at a different bandwidth of the 5G spectrum.

In an embodiment, the one or more processors may be configured to determine a location of the DC-subcarrier of each UE belonging to different bandwidth.

In an embodiment, the DC carrier power level may increase in steps of predetermined decibels (dB) to achieve lower than the predetermined target BLER.

In an aspect, the present disclosure provides for a method for facilitating improved sector throughput. The method may include the steps of: receiving, by one or more processor, a set of data packets from the plurality of UEs pertaining to downlink (DL) feedback communication signals from each UE. In an embodiment, the one or more processors may be operatively coupled to a plurality of user equipments (UE) having a downlink communication channel with a multi-input multi output (MIMO) base-station. The method may also include the steps of extracting, by the one or more processors, a first set of attributes from the received set of data packets, the first set of attributes pertaining to a DL Block Error Rate (BLER) in each UE and determining, by the one or more processors, based on the extracted first set of attributes, an average BLER of each UE. Further, the method may include the steps of comparing, by the one or more processors, the determined average BLER of each UE with a predetermined target BLER and determining, by the one or more processors, if each said UE is allocated with a resource block (RB) containing a DC subcarrier. If the determined average BLER is greater than the predetermined target BLER in a UE and the UE is allocated with the resource block (RB) containing the DC subcarrier module, the method may include the step of increasing, by the one or more processors, a DC subcarrier power level in the RB containing the DC-subcarrier up to a maximum pre-determined level.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution for facilitating improved downlink MIMO sector throughput in the presence of UE DC-offset. The proposed solution leads to obtaining a CRC PASS and a full sector throughput increase to at least 405 Mbps. Thus, with the proposed solution, a 100% sector throughput will be achieved with ~0% BLER.

Figure 1A:
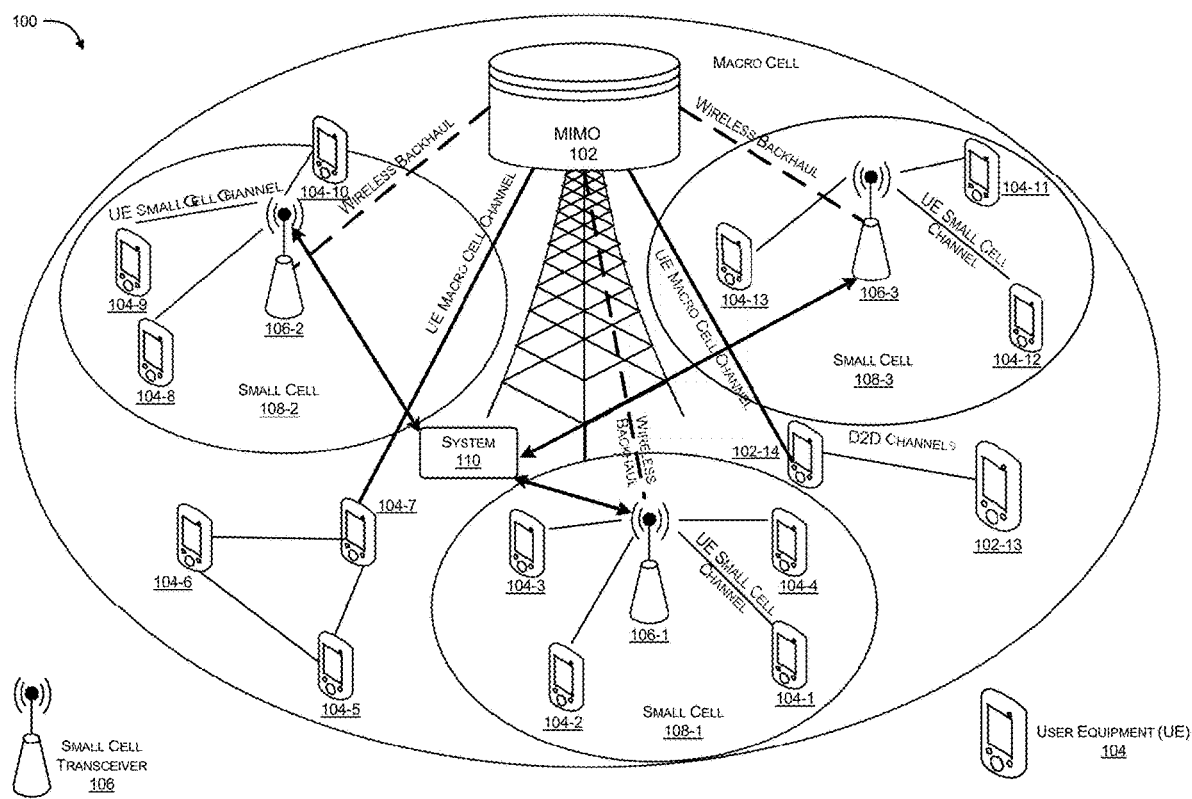
FIGS. 1A-1B illustrate exemplary representation of the proposed system, in accordance with an embodiment of the present disclosure.

FIG. 1A illustrates an exemplary network architecture in which or with which the system of the present disclosure can be implemented, in accordance with an embodiment of the present disclosure. As illustrated, in an aspect, a multi-input multi output (MIMO) base-station (102) may provide downlink feedback communication signals to a plurality of user equipments (UE) (104-1, 104-2, ... 104-N). In an exemplary embodiment, the plurality of UEs 104-1, 104-2, 104-N may be independently connected the MIMO base-Station (102).

Figure 1B:
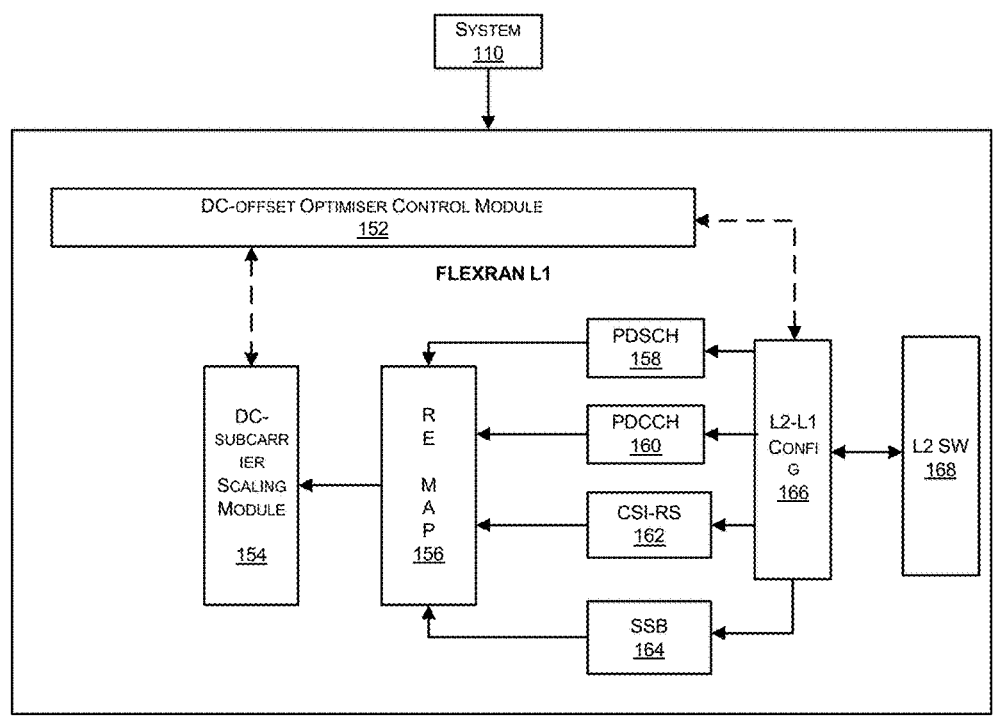

FIG. 1B illustrates that the MIMO base-station (102) may be operatively coupled to the proposed system (110). The system (110) may be operatively coupled to one or more processors (202) (reference FIG. 2) that may be associated with a DC offset optimiser control module (152), a DC-subcarrier scaling module (154), L2-L1 Config module (166), and Layer 2 software (SW) module (168) (also referred to as gNode Software (SW) herein), all of which are interacting with standard data-path downlink processing modules (156-164).

In an exemplary embodiment, the UE (104) may be allocated with a resource block (RB) containing a DC subcarrier. One of the embodiments shows a Layer 1/Layer 2 Downlink architecture wherein the control path is contained in the DC offset Optimiser Module 152, and the data path which does the DC-subcarrier Power Boost/Deboost is contained in the DC-subcarrier scaling module, 154. Further, the plurality of UEs may be operatively coupled to a downlink communication channel with a multi-input multi output (MIMO) base-station. The DC offset Optimiser Module 152, DC-subcarrier scaling module 154 may be hooked on to Downlink communication channel that may include a Physical Data Shared Channel, 158, a Physical Data Control Channel, 160, a Channel State Indicator—Reference Signal, 162, a Synchronisation Signal Block which includes a Primary Synchronisation Signal, a Secondary Synchronisation Signal, a Primary Broadcast Channel all contained in 164. All these modules may be combined in a Resource Element Mapper, 156. Part of the embodiment is implemented in the Layer-2, 168, which acts upon triggers received from the DC offset Optimiser Module 152, over the L2-L1 interface block, 166.

In an embodiment, the one or more processors, 202, causes the system 110 to receive, a set of data packets from the plurality of UEs, 104, the set of data packets pertaining to downlink (DL) feedback communication signals from each UE, 104. The system, 110, then may extract, a first set of attributes from the received set of data packets, the first set of attributes pertaining to a DL Block Error Rate (BLER) in each said UE and then determine, based on the extracted first set of attributes, an average BLER of each UE. The system, 110, may then compare the determined average BLER of each UE with a predetermined target BLER and then determine if each UE is allocated with a resource block (RB) containing a DC subcarrier. If the determined average BLER is greater than the predetermined target BLER in a UE and the UE is allocated with the resource block (RB) containing the DC subcarrier scaling module, the system, 110, may then increase, a DC subcarrier power level in the RB containing the DC-subcarrier up to a maximum predetermined level.

In an embodiment, a throughput of the UE may increase to a predefined level in response to a decrease in the BLER to a pre-determined level. In an embodiment, if BLER improves in the UE to a pre-determined level, the one or more processors may be further configured to prevent scheduling of further power increase on the DC-subcarrier; and, continue to maintain the DC-subcarrier power on the UE until the UE has come closer to the base-station in terms of power level.

In an embodiment, the system, 110, may de-boost the increased DC-subcarrier power level on the RB containing the DC-carrier; and, maintain a full throughput in the RB containing the DC-carrier.

In another embodiment, the system, 110, may determine whether the UE power level has moved closer to the MIMO base station power level based on one or more reports on tracking of one or more UE Power Headroom reports received from the UE; and reduce the boost of the DC-carrier power level by a predefined amount.

In yet another embodiment, the system, 110, may determine whether the UE is receiving a Downlink communication signal with a higher signal strength based on tracking of one or more UE Power Headroom reports received from the UE; and reduce the boost of the DC-carrier power level by a predefined amount.

In case the BLER does not improve to less than the predetermined target BLER via boosting the DC subcarrier power level, the system, 110, may conclude that the BLER is not due to DC-offset leakage and hence terminates; and, terminate increase in the DC subcarrier power level.

In a way of example, and not as a limitation, the gNode Software (SW) keeps track of DL Block Error Rate (BLER) in a UE, and if (a) that UEs average BLER is greater than a Target BLER (10%) AND (b) the UE is allocated the RB containing the DC subcarrier, then the SW will power increase the RB containing the DC-subcarrier up to a maximum pre-determined level, for example, 12 dB, in steps of 3 dB, and if BLER improves in that UE, as a consequence, then the SW will not schedule further power increases on that DC-subcarrier. Since this results in improved UE/sector throughput, the SW will continue to maintain that RE DC-subcarrier power on the affected UE until it deems fit that the UE has come closer to the base-station (and has increased number of available IQ received bit-width now) and then SW decides to deboost the boosted DC-subcarrier power on that RE containing the DC-carrier whilst maintaining full throughput. One way of deciding this will be via detecting an increase in UE Power Headroom reports by tracking the UE Power Headroom reports received from the UE which indicates to the gNodeB SW that the UE has moved closer to the Base station or is receiving the Downlink received signal with higher signal strength and hence the boost of DC-subcarrier RE may be reduced. The UE then accordingly reduces the power whilst all the while checking if the UE BLER is less than target BLER, i.e., 10%. In case the BLER does not improve to less than 10% via boosting the signal power, the gNodeB SW concludes that the BLER is not due to DC-offset leakage and hence terminates.

In an exemplary embodiment, the system (110) may lead to a higher Downlink throughput improvement in the case of multiple bandwidth parts. Multiple bandwidth parts is a feature introduced in 5G NR in order to support devices (UEs) that does not support receiving the full Carrier Bandwidth. Consequently, in 5G NR each NR device (UE) may have its DC-subcarrier located at different locations in the Carrier, unlike LTE where all the devices have DC-subcarrier coinciding with the center of the carrier. Therefore, in NR it was decided to accept the quality of this DC-subcarrier may be degraded in some situations. Hence each DC-carrier of each UE can be subjected to disproportionately high interference to the UEs local oscillator DC-leakage.

In an exemplary embodiment, the system (110) may support a plurality of 5G new radio (NR) UEs with different bandwidth wherein the DC-carrier of each UE can be worked out by the L2 using the UE CAPABILITY RESPONSE message it receives which will convey to the L2 the bandwidth supported by each UE. The Layer 2 SW can notify the Layer 1 SW the UE RNTI (Radio Network Temporary Identifier) which includes the DC subcarrier in its RB allocation per TTI, as explained in the flowchart of FIG. 2, via the standard 3GPP DL CONFIG REQ message over the L2-L1 interface. The Layer 1 gNodeB software can then apply the same invention as above for each of the UEs for which its DC-subcarrier is included in its RB allocation. As the number of Bandwidth Parts supported increases, using the control described in the flowchart higher total sector/cell-throughput can be achieved in the network over a state-of-the art 5G deployment in the network.

Figure 2:
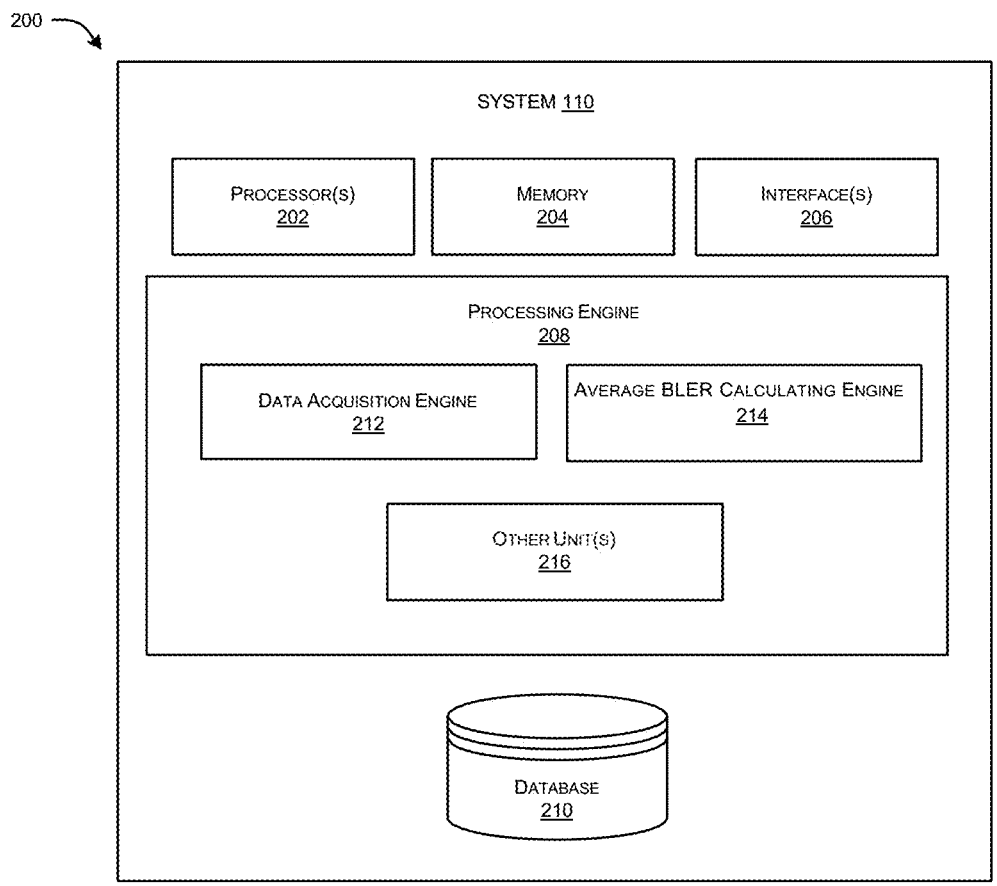
FIG. 2 illustrates an exemplary representation (200) of system, in accordance with an embodiment of the present disclosure.

FIG. 2 illustrates an exemplary representation of the proposed system, 110, in accordance with an embodiment of the present disclosure. In an aspect, the system, 110 may include one or more processor(s), 202. The one or more processor(s), 202 may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s), 202, may be configured to fetch and execute computer-readable instructions stored in a memory, 204, of the system, 110. The memory, 204, may store one or more computer-readable instructions or routines in a non-transitory computer readable storage medium, which may be fetched and executed to create or share data packets over a network service. The memory, 204, may comprise any non-transitory storage device including, for example, volatile memory such as RAM, or non-volatile memory such as EPROM, flash memory, and the like.

In an embodiment, the system, 110, may include an interface(s), 206. The interface(s), 206 may comprise a variety of interfaces, for example, interfaces for data input and output devices, referred to as I/O devices, storage devices, and the like. The interface(s), 206, may facilitate communication of the system, 110. The interface(s), 206, may also provide a communication pathway for one or more components of the system, 110. Examples of such components include, but are not limited to, processing unit/engine(s) (208) and a database (210).

The processing unit/engine(s), 208, may be implemented as a combination of hardware and programming (for example, programmable instructions) to implement one or more functionalities of the processing engine(s), 208. In examples described herein, such combinations of hardware and programming may be implemented in several different ways. For example, the programming for the processing engine(s), 208 may be processor executable instructions stored on a non-transitory machine-readable storage medium and the hardware for the processing engine(s), 208, may comprise a processing resource (for example, one or more processors), to execute such instructions. In the present examples, the machine-readable storage medium may store instructions that, when executed by the processing resource, implement the processing engine(s), 208. In such examples, the system, 110, may comprise the machine-readable storage medium storing the instructions and the processing resource to execute the instructions, or the machine-readable storage medium may be separate but accessible to the system, 110 and the processing resource. In other examples, the processing engine(s), 208 may be implemented by electronic circuitry.

The processing engine, 208, may include one or more engines selected from any of a data acquisition engine, 212, average BLER calculating engine, 214 and other engines 216. The other engines 216 may further include the DC offset optimiser control module (152), the DC-subcarrier scaling module (154), the L2-L1 Config module (166), and Layer 2 software (SW) module (168) (also referred to as gNode Software (SW) herein), all of which are interacting with standard data-path downlink processing modules (156-164) but not limited to the like.

Figure 3:
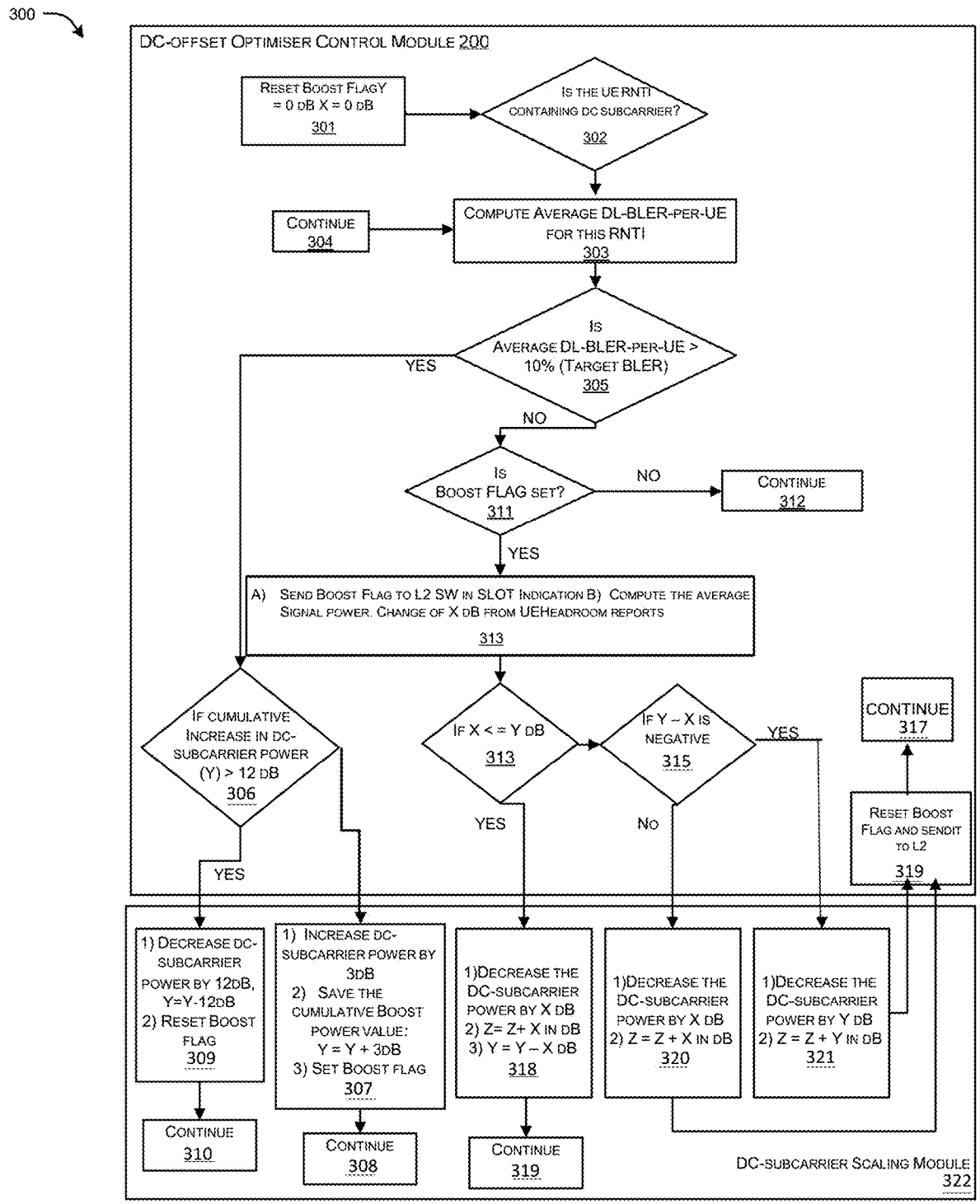
FIG. 3 illustrates an exemplary flow diagram of the proposed method, in accordance with an embodiment of the present disclosure.

FIG. 3 illustrates an exemplary flow diagram of the proposed method, in accordance with an embodiment of the present disclosure. In one embodiment describing the Architecture of 110 containing the modules illustrated as a flowchart is the method, 300 and 322, respectively for DC-offset Optimiser Control Module and DC-subcarrier Scaling Module, respectively, which enables to improve sector throughput in the presence of DC-offset interference in UEs which receive less than 8-bit dynamic range of the downlink signal since they are further away in distance from the gNodeB. To start with, in this method, the Average-DL-BLER-per-UE, 301, for each UE RNTI (Radio Network Temporary Indicator) for which the allocation of resources (PRBs) that includes the DC-subcarrier, 302, is computed by the gNodeB software. If this Average-DL-BLER-per-UE is greater than a Target BLER (10%), in 305, then it is decided to Power-Boost the DC-subcarrier up to a pre-determined relative power level, 306. In one embodiment the predetermined relative power level is 12 dB. The Power-Boost is increased iteratively in steps of 3 dB, in 307, and a Boost flag is set to indicate that power boost has been done, in 307. Also, the cumulative Power Boost applied until then is recorded as Y dB in 307. Then, again the measurement loop of 302 and 305 is continued, 308 and 304, and if the Average-DL-BLER-per-UE is still greater than 10%, then the boosting operation of 306-307 is continued. If during the check the Average-DL-BLER-per-UE of 305 turns out to be less than 10%, and if the Power-Boost flag is set earlier in 307, then the gNodeB Physical layer will constantly monitor if the UE Power Headroom reported from Layer-3 software (L3) when requested by it, in 312, has improved. This improvement, X dB, is obtained, in 312, by computing the average of the differences of successive UE Power Headroom reports received from L3. When the average UE Power Headroom signal has improved, which is indicative of the UE having moved closer to the gNodeB and/or its SINR having improved, the Power Deboost of the DC-subcarrier is triggered, in 314 and 318. Following which, the measurement loop of 303 and 305 is continued, 317 and 304, and if now the Average-DL-BLER is still lesser than 10%, then the de-Boosting operation of 311-318 is continued, until the whole Y dB of Boosted power in 307 is de-Boosted, following which the de-Boost flag is reset and informed to the L3 which then stops sending the UE Power Headroom report to L1. In some cases, even after boosting the DC-subcarrier power to the pre-determined max level if the Average DL-BLER-per-UE remains greater than the Target BLER, in 302, then the DC-subcarrier power is de-Boosted and Boost flag reset in 309 and the measurement loop of 302 and 305 is continued. In order to ensure that the de-Boosting of the whole Y dB is completed, certain boundary conditions check of 315, 320 and 321 is done after which the de-Boost flag is reset and sent to L3, 316. This flow chart method is only triggered for UEs for which the RB allocation per Transmission Time Interval (TTI) includes the DC-subcarrier and for such cases the Boost Flag is reset, X and Y is set to 0 dB as initial conditions, in 301.

In an exemplary embodiment, the method (300) may support a plurality of 5G NR UEs with different bandwidth wherein the DC-carrier of each UE can be worked out by the L2 by a set of predefined instructions.

Figure 4A:
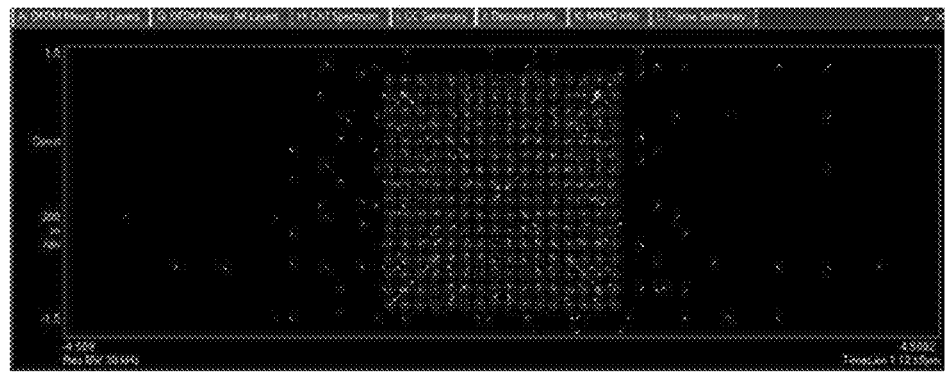
FIGS. 4A-4D illustrate exemplary representations of an existing system for a 100 Mhz, 8UE/TTI in accordance with an embodiment of the present disclosure.
Figure 4B:
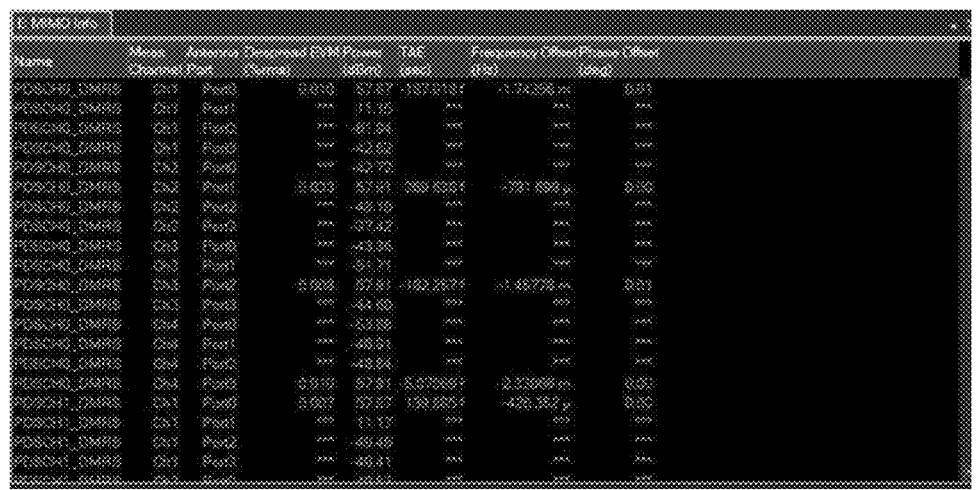

FIGS. 4A-4D illustrate exemplary representations of an existing system for a 100 Mhz, 8UE/TTI in accordance with an embodiment of the present disclosure. As illustrated in FIG. 4A, the DC-carrier RB (start RB, RE0) for each UE was deliberately shifted down by 2 bits and the EVM of 256-QAM Constellation is disbursed and it decoded on Keysight VSA in FIG. 4B and the VSA returned CRC FAIL on all the 8 UEs in FIG. 4C. 1 antenna, start RB, 0th RE for all UE's, for all 14 symbols, 256qam, mcs-27 is given below:

| UE-0, 0-33 rbs | −34 rbs CRC FAIL |
| UE-1, 34-67 rbs | −34 rbs CRC FAIL |
| UE-2, 68-101 rbs | −34 rbs CRC FAIL |
| UE-3, 102-135 rbs | −34 rbs CRC FAIL |
| UE-4, 136-169 rbs | −34 rbs CRC FAIL |
| UE-5, 170-203 rbs | −34 rbs CRC FAIL |
| UE-6, 204-237 rbs | −34 rbs CRC FAIL |
| UE-7, 238-272 rbs | −35 rbs CRC FAIL |

Figures 4C, 4D:
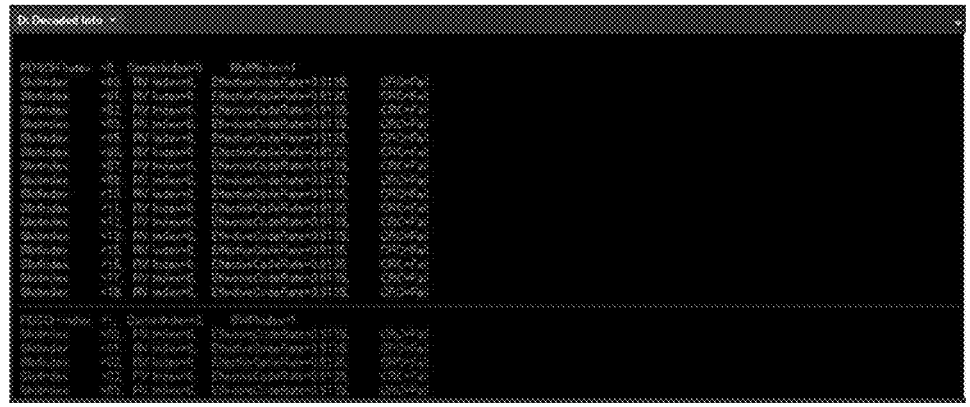

This was done on 1 antenna IQ of the start RB, $0^{th}$ RE for all UEs 14 symbol allocation. The constellation plot was disbursed as shown in FIG. 4A and PDSCH EVM was >11% for 256-QAM (3GPP specs requires <5%) as shown in FIG. 4D and Average EVM is 5.5%.

Figure 5A:
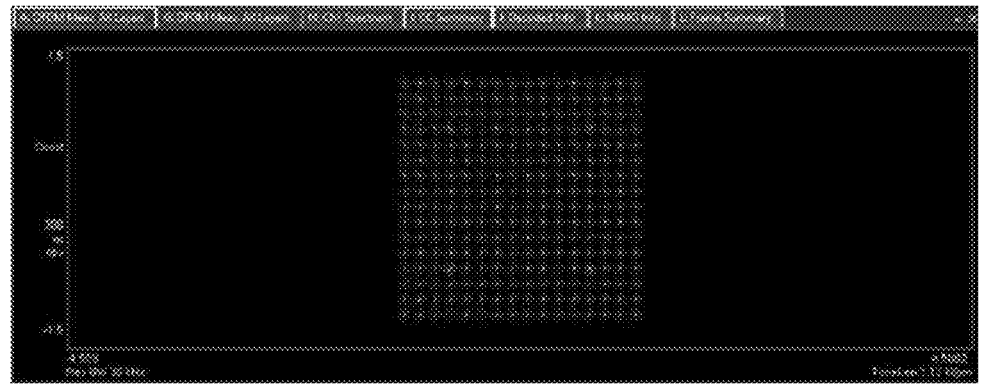
FIGS. 5A-5D illustrate exemplary representations of the proposed system for a 100 Mhz, 8UE/TTI in accordance with an embodiment of the present disclosure.
Figure 5B:
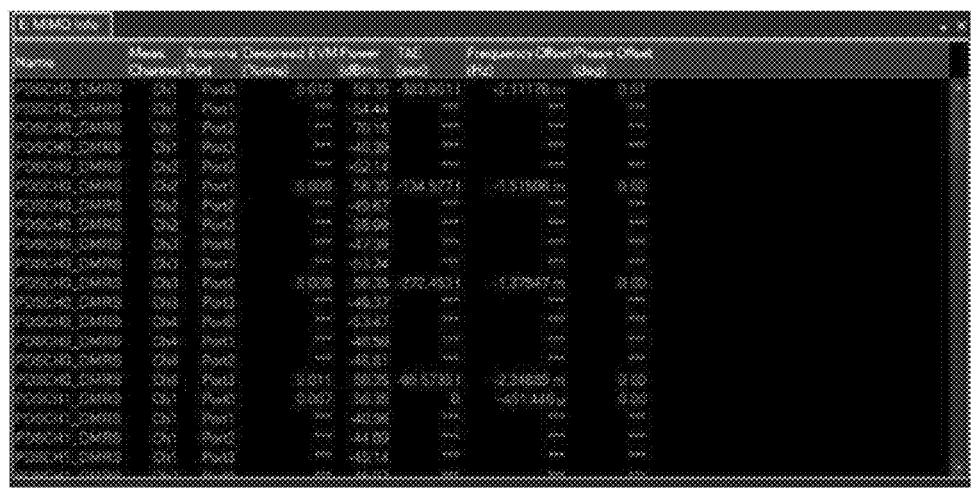
Figure 5C:
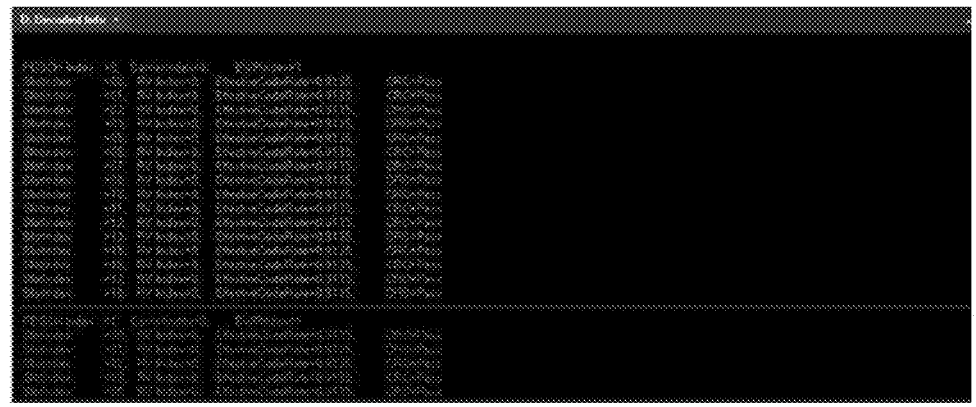

FIGS. 5A-5D illustrate exemplary representations of the proposed system for a 100 Mhz, 8UE/TTI in accordance with an embodiment of the present disclosure. After applying the proposed method in the system of increasing the power by left-shift of 2 bits, FIG. 5A, FIG. 5B and FIG. 5C shows that the EVM of 256-QAM Constellation is perfect i.e., with 12 dB increase on the DC sub-carrier ($0^{th}$ RE) all UEs pass CRC as indicated below:

| UE-0, 0-33 rbs | −34 rbs CRC PASS |
| UE-1, 34-67 rbs | −34 rbs CRC PASS |
| UE-2, 68-101 rbs | −34 rbs CRC PASS |
| UE-3, 102-135 rbs | −34 rbs CRC PASS |

| | |
|---|---|
| UE-4, 136-169 rbs | −34 rbs CRC PASS |
| UE-5, 170-203 rbs | −34 rbs CRC PASS |
| UE-6, 204-237 rbs | −34 rbs CRC PASS |
| UE-7, 238-272 rbs | −35 rbs CRC PASS |

Figure 5D:
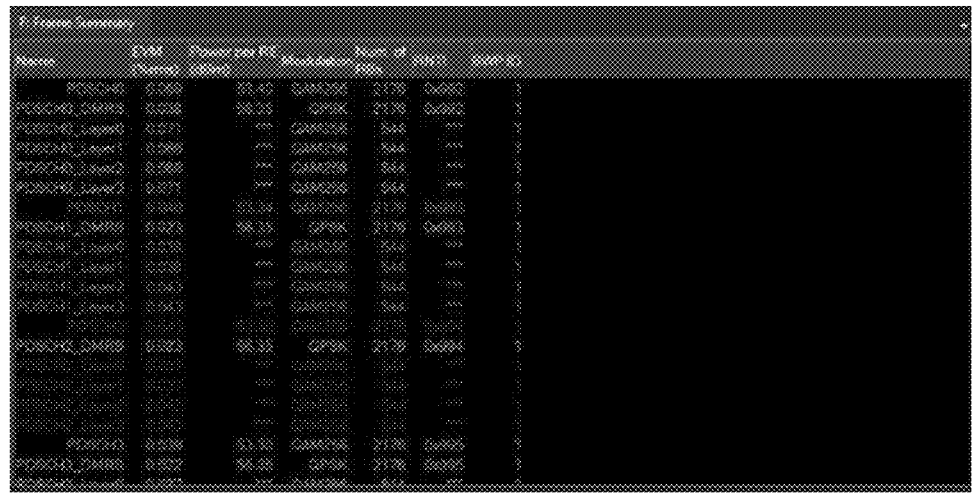

FIG. 5D illustrates, the PDSCH Antenna 1 EVM is 0.02% and Average EVM is 0.02%.

Figure 6:
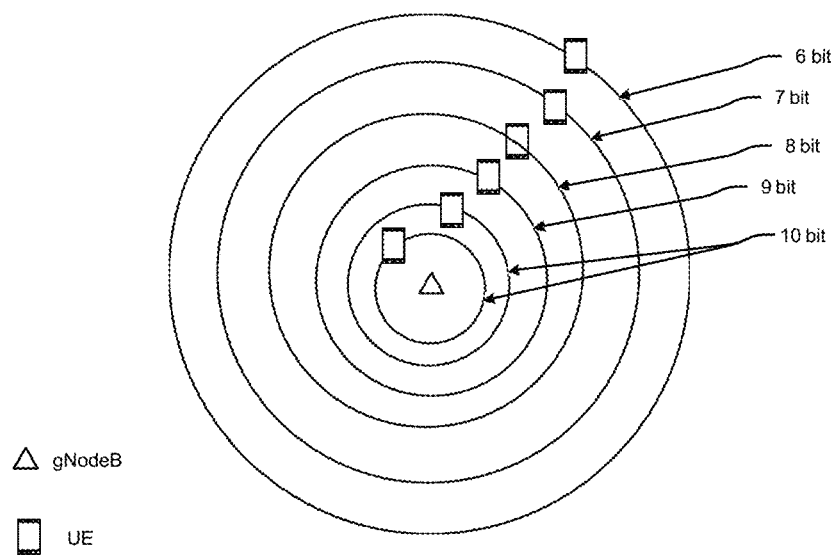
FIG. 6 illustrates exemplary representation of coverage map of concentric circles from a base station for an existing method in accordance with an embodiment of the present disclosure.

FIG. 6 illustrates exemplary representation of coverage map of concentric circles from a base station for an existing method in accordance with an embodiment of the present disclosure. In an exemplary embodiment, a UE may be at such a distance away from the base station that the UE receiver's ADC FullScale even after a maximum gain of 40 dB from its preceding AGC block will only generate 8-bits IQ sample bit-width, for e.g., as indicated in the coverage map of concentric circles in FIG. 5. Here the SINR=34 dB such that 256-QAM can be supported on all subcarriers, but on the DC-carrier, due to the DC-offset interference of typically −60 dBm, the SINR=12 dB and therefore 256-QAM will fail on the DC-subcarrier as explained already above.

TABLE 3 highlights the different scenarios for DC offset of a UE.

| DC-offset leakage (best-case) | DC-offset interference at ADC input after max AGC gain = 40 dB (typical max value of ADI RFICs) | Signal power level at 40 dB max AGC gain | Noise Floor with Noise Figure = 10 dB with 40 dB AGC gain | SINR at DC-carrier | SINR at non DC-carrier | DL DC-carrier Average IQ Bit-width (excl. 2 bits for PAPR) |
|---|---|---|---|---|---|---|
| −100 dBm/RE | −100 + 40 = −60 dBm/RE | −36 dBm/RE | −82 dBm/RE | −36 − (−60 dB) = 24 dB | −36 − (−82 dB) = 46 dB | 10-bit |
| −100 dBm/RE | −100 + 40 = −60 dBm/RE | −42 dBm/RE | −82 dBm/RE | −42 − (−60 dB) = 18 dB | −42 − (−82 dB) = 40 dB | 9-bit |
| −100 dBm/RE | −100 + 40 = −60 dBm/RE | −48 dBm/RE | −82 dBm/RE | −48 − (−60 dB) = 12 dB | −48 − (−82 dB) = 34 dB | 8-bit |
| −100 dBm/RE | −100 + 40 = −60 dBm/RE | −54 dBm/RE | −82 dBm/RE | −54 − (−60 dB) = 6 dB | −54 − (−82 dB) = 28 dB | 7-bit |
| −100 dBm/RE | −100 + 40 = −60 dBm/RE | −60 dBm/RE | −82 dBm/RE | −60 − (−60 dB) = 0 dB | −60 − (−82 dB) = 22 dB | 6-bit |

At 40 dB typical maximum automatic gain control (AGC) Gain of ADI RFICs and −5 dBm/20 Mhz AGC setpoint (for an UE ADC with 7 dBm Full-Scale RMS power—typical of ADI RFICs)=>−36 dBm/RE will be the per-RE Signal power at ADC input. The thermal noise floor is −122 dBm/RE (for mu=0 and a UE Noise Figure=10 dB) which amplified by the 40 dB AGC Gain comes to −82 dBm/RE Thermal noise power. Therefore, this implies SNR=46 dB.

When the UE moves further away from base station such that the same received downlink experiences a further increase in Path Loss by 12 dB, then the received average downlink signal power/20 Mhz is reduced to −17 dBm/20 Mhz. At −17 dBm/20 Mhz received RMS signal power this implies −48 dBm/RE. SNR=34 dB.

When the UE moves even further away, the Path Loss increases further such that −23 dBm/20 Mhz is the received average signal power. At −23 dBm/20 Mhz this implies RMS signal power is −54 dBm/RE. SNR=28 dB. But at DC subcarrier the DC-offset explained earlier is at −60 dBm/Hz level becomes the dominant Noise contributor over the thermal noise-floor of −82 dBm/RE. So, the SNR at DC-offset becomes −54−(−60)=6 dB leading to CRC FAIL in the whole slot where 256-QAM highest MCS is transmitted. At other REs, the SNR=28 dB since the noise-level will be −82 dB/RE i.e., −122 dBm/RE+40 dB (AGC Gain) (NF=10 dB). But since in the case the average CQI reported over the 12 RBs by the UE will be high at 15, 256-QAM will be scheduled by the scheduler. And the code-rate will be therefore at the highest at 0.93. At 0.93 code-rate (a) the redundancy will be very low and (b) along with, with the SNR=6 dB on the DC-subcarrier as explained above, the Demodulation reference symbol (DMRS) REs located at the DC-subcarrier throughout that slot will be affected leading to incorrect channel estimation for that particular RB including the DC-subcarrier; therefore (a) and (b) together resulted in CRC FAIL in a 4×4 DL MIMO. Thus, CRC FAIL was encountered for all retransmissions on that UE RNTI that had RB allocation that included the DC-carrier for the 12 RBs.

Figure 7:
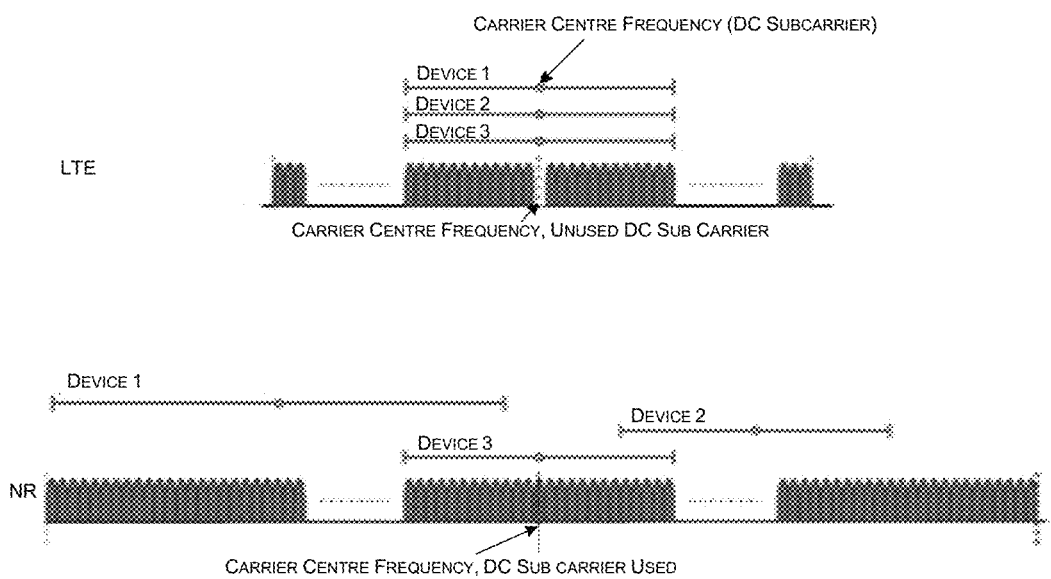
FIG. 7 illustrates exemplary representation of handling of DC subcarrier in LTE and NR, in accordance with an embodiment of the present disclosure.

FIG. 7 illustrates exemplary representation of handling of DC subcarrier in LTE and NR, in accordance with an embodiment of the present disclosure. As illustrated, in an exemplary embodiment, the system may support a plurality of 5G NR UEs with different bandwidth wherein the DC-carrier of each UE can be worked out by the L2 using the UE CAPABILITY RESPONSE message it receives which will convey to the L2 the bandwidth supported by each UE. The L2 can then apply the same invention above and notify the L1 to increase the Power of the allocated DC RB (or sub-carrier) when it finds that there is unfavourably high BLER even though the CQI reported by that UE is 15 and all other sub-carriers are able to support 256-QAM due to high enough SINR except the DC-carrier whose SINR is impacted as indicated in the Table 3 above.

Figure 8A:
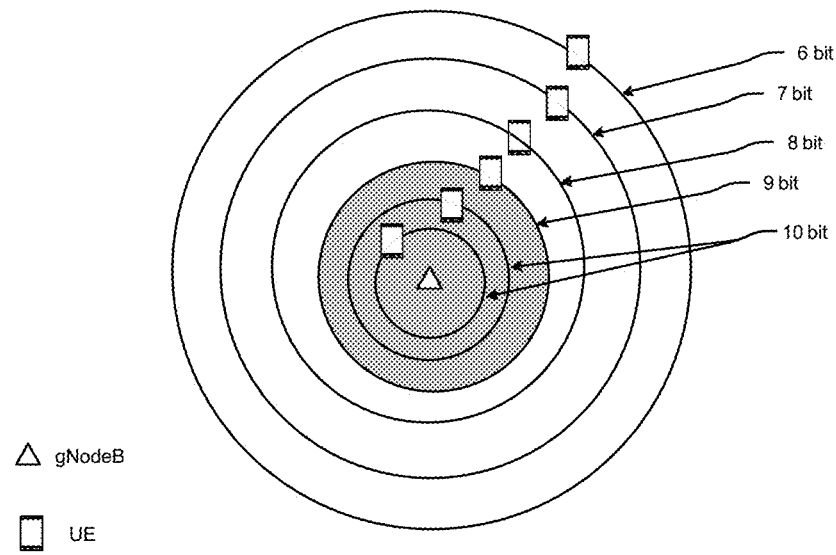
FIGS. 8A-8D illustrate exemplary representations of differences between existing system and proposed system in accordance with an embodiment of the present disclosure.
Figure 8B:
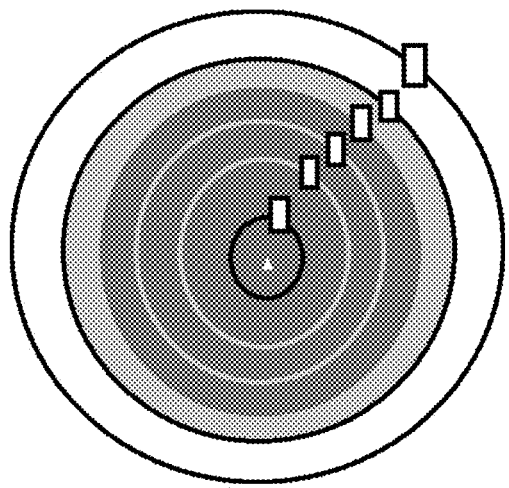
Figure 8C:
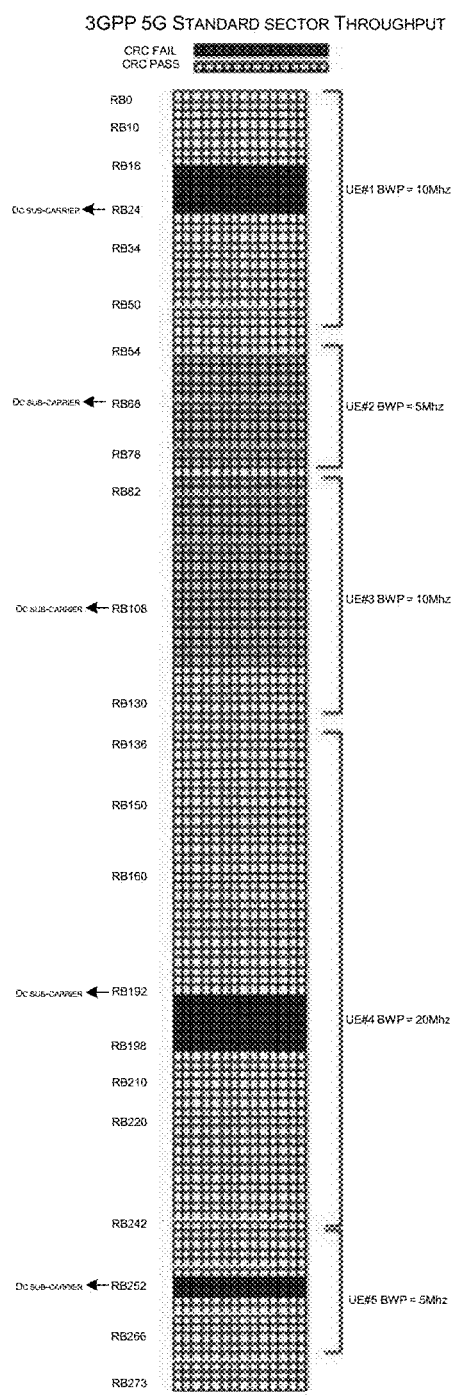
Figure 8D:
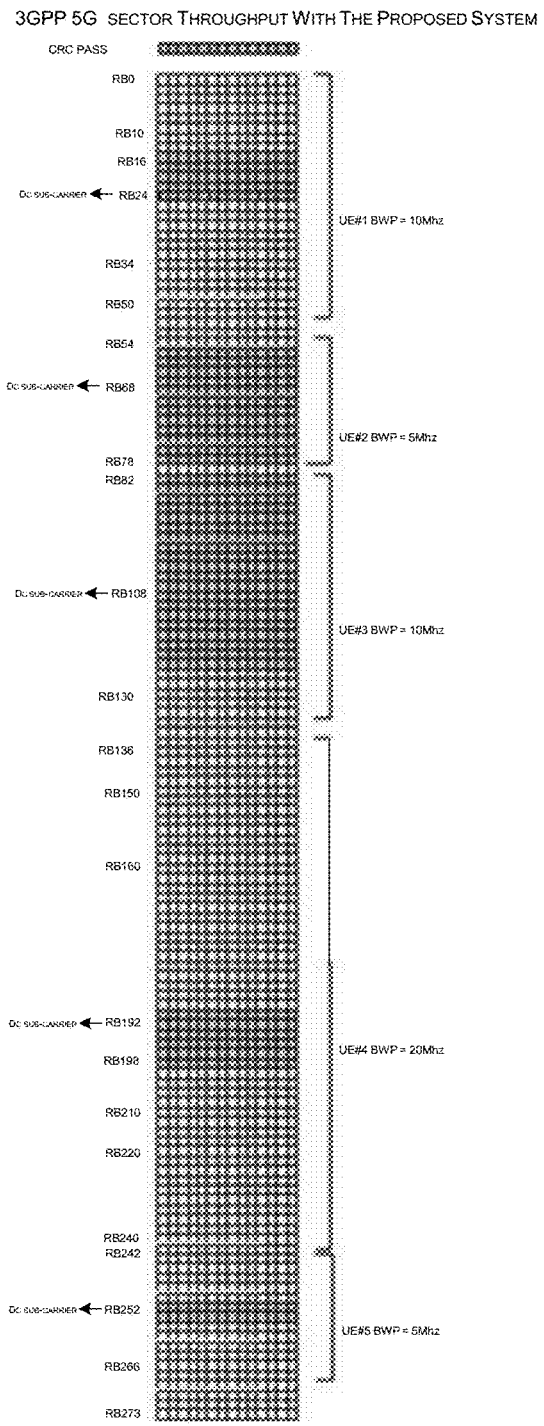

FIGS. 8A-8D illustrate exemplary representations of differences between existing system and proposed system in accordance with an embodiment of the present disclosure. FIG. 8A illustrates a coverage map of concentric circles from a base station with an existing method while FIG. 8B illustrates a coverage map of concentric circles from a base station with the proposed method wherein the 256-QAM coverage increases to the 8 bit concentric circle. FIG. 8C illustrates a representation of 3GPP 5G standard throughput of multiple BWP, where multiple UEs with different bandwidths are supported and highlights CRC fails at lesser Resource allocations UEs and CRC passes for higher Resource allocations UEs while FIG. 8D illustrates a significantly higher throughput will be obtained in 5G sector throughput with the proposed system and method where only CRC passes are present by configuring L1 to deliberately Increase the power of the RE containing the DC-subcarrier so that CRC is Passed for those UEs that were earlier failing.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure to provides a method and system that decreases BLER in UEs in DL MIMO sector.

The present disclosure to provides a method and system that increases throughput.

The present disclosure to provides a method and system that prevents CRC fail.

The present disclosure to provides a method and system that supports multiple 5G NR UEs with different bandwidth wherein the DC-carrier of each UE can be worked out by the L2.

We claim:

1. A system (110) for facilitating improved sector throughput, said system comprising:
   one or more processors operatively coupled to a plurality of user equipments (UE), said plurality of UEs further having a downlink communication channel with a multi-input multi output (MIMO) base-station,
   wherein the one or more processors (202) that executes a set of executable instructions that are stored in a memory (204), upon execution of which, the processor (202) causes the system (110) to:
      receive, a set of data packets from the plurality of UEs (104), said set of data packets pertaining to downlink (DL) feedback communication signals from each UE;
      extract, a first set of attributes from the received set of data packets, the first set of attributes pertaining to a DL Block Error Rate (BLER) in each said UE;
      determine, based on the extracted first set of attributes, an average BLER of each said UE;
      compare the determined average BLER of each said UE with a predetermined target BLER;
      determine if each said UE is allocated with a resource block (RB) containing a direct current (DC) subcarrier;
      increase a DC subcarrier power level in the RB containing the DC-subcarrier up to a maximum pre-determined level if the determined average BLER is greater than the predetermined target BLER in a UE and the UE is allocated with the resource block (RB) containing the DC subcarrier module.

2. The system (110) as claimed in claim 1, wherein a throughput of said UE increases to a predefined level in response to a decrease in the BLER to a pre-determined level.

3. The system (110) as claimed in claim 1, wherein if BLER improves in the UE to a pre-determined level, the one or more processors is further configured to:
   prevent scheduling of further power increase on the DC-subcarrier; and,
   continue to maintain the DC-subcarrier power on the UE until the UE has come closer to the base-station in terms of power level.

4. The system (110) as claimed in claim 1, wherein the one or more processors is further configured to:
   de-boost the increased DC-subcarrier power level on the RB containing the DC-carrier; and,
   maintain a full throughput in the RB containing the dc-carrier.

5. The system (110) as claimed in claim 4, wherein the one or more processors is further configured to:
   determine whether the UE is receiving a downlink communication signal with a higher signal strength based on tracking of one or more UE power headroom reports received from the UE; and
   reduce the boost of the dc-carrier power level by a predefined amount.

6. The system (110) as claimed in claim 1, wherein the one or more processors is further configured to:
   determine whether the UE power level has moved closer to the MIMO base station power level based on one or more reports on tracking of one or more UE Power Headroom reports received from the UE; and
   reduce the boost of the dc-carrier power level by a predefined amount.

7. The system (110) as claimed in claim 1, in case the BLER does not improve to less than the predetermined target BLER via boosting the dc subcarrier power level, the one or more processors is configured to:
   conclude that the BLER is not due to DC-offset leakage; and,
   terminate increase in the dc subcarrier power level based on the conclusion that the BLER is not due to DC-offset leakage.

8. The system (110) as claimed in claim 1, wherein the one or more processors are operatively coupled to a plurality of bandwidth channels to support the plurality of UEs to receive a full carrier bandwidth.

9. The system (110) as claimed in claim 8, wherein the one or more processors are configured to support a plurality of UEs with different bandwidth parts wherein the DC-subcarrier of each UE is located at a different bandwidth of the 5G spectrum.

10. The system (110) as claimed in claim 9, wherein the one or more processors are configured to determine a location of the DC subcarrier of each UE belonging to different bandwidth.

11. The system (110) as claimed in claim 1, wherein the DC carrier power level increases in steps of predetermined decibels (dB) to achieve a lower BLER than the predetermined target BLER.

12. A method for facilitating improved sector throughput, said method comprising:
   receiving, by one or more processor, a set of data packets from the plurality of UEs (104), said set of data packets pertaining to downlink (DL) feedback communication signals from each UE,
      wherein the one or more processors operatively coupled to a plurality of user equipments (UE), said plurality of UEs further having a downlink communication channel with a multi-input multi output (MIMO) base-station, wherein the one or more processors (202) that executes a set of executable instructions that are stored in a memory (204);

extracting, by the one or more processors, a first set of attributes from the received set of data packets, the first set of attributes pertaining to a DL Block Error Rate (BLER) in each said UE;

determining, by the one or more processors, based on the extracted first set of attributes, an average BLER of each said UE;

comparing, by the one or more processors, the determined average BLER of each said UE with a predetermined target BLER;

determining, by the one or more processors, if each said UE is allocated with a resource block (RB) containing a direct current (DC) subcarrier;

increasing, by the one or more processors, a DC subcarrier power level in the RB containing the dc-subcarrier up to a maximum pre-determined level if the determined average BLER is greater than the predetermined target BLER in a UE and the UE is allocated with the resource block (RB) containing the DC subcarrier module.

13. The method as claimed in claim 12, wherein decrease in the BLER to a pre-determined level leads to an increase in throughput of said UE to a predefined level.

14. The method as claimed in claim 12, wherein if BLER improves in the UE to a pre-determined level, the method further comprises the steps of:
prevent scheduling, by the one or more processors, further power increase on the DC-subcarrier; and
continuing, by the one or more processors, to maintain the DC-subcarrier power on the UE until the UE has come closer to the base-station in terms of power level.

15. The method as claimed in claim 12, wherein the method further comprises the steps of:
deboosting, by the one or more processors, the increased DC-subcarrier power level on the RB containing the dc-carrier; and, maintaining, by the one or more processors, a full throughput in the RB containing the dc-carrier.

16. The method as claimed in claim 12, wherein the method further comprises the steps of:
determining, by the one or more processors, whether the UE power level has moved closer to the MIMO base station power level based on tracking of one or more UE Power Headroom reports received from the UE; and,
reducing, by the one or more processors, the boost of the dc-carrier power level by a predefined amount.

17. The method as claimed in claim 12, wherein the method further comprises the steps of:
determining, by the one or more processors, whether the UE is receiving a Downlink communication signal with a higher signal strength based on one or more reports on tracking of one or more UE Power Headroom reports received from the UE; and,
reducing, by the one or more processors, the boost of the dc-carrier power level by a predefined amount.

18. The method as claimed in claim 12, wherein in case the BLER does not improve to less than the predetermined target BLER via boosting the dc subcarrier power level, the method further comprises the steps of:
concluding, by the one or more processors, that the BLER is not due to DC-offset leakage; and,
terminating, by the one or more processors, increase in the dc subcarrier power level based on the conclusion that the BLER is not due to DC-offset leakage.

19. The method as claimed in claim 12, wherein the one or more processors are operatively coupled to a plurality of bandwidth channels to support the plurality of UEs to receive a full carrier bandwidth.

20. The method as claimed in claim 19, wherein the one or more processors are configured to support a plurality of UEs with different Bandwidth wherein the DC-subcarrier of each UE is located at a different bandwidth of the 5G spectrum.

* * * * *